United States Patent [19]
Kilby

[11] 4,001,947
[45] Jan. 11, 1977

[54] TEACHING SYSTEM

[76] Inventor: Jack S. Kilby, 7723 Midbury, Dallas, Tex. 75230

[22] Filed: Aug. 16, 1973

[21] Appl. No.: 388,884

Related U.S. Application Data

[63] Continuation of Ser. No. 154,493, June 18, 1971, abandoned.

[52] U.S. Cl. .................................. 35/9 B; 35/35 C
[51] Int. Cl.² .......................................... G09B 7/02
[58] Field of Search ........... 35/9 R, 9 A, 9 B, 35 R, 35/35 C

[56] References Cited
UNITED STATES PATENTS

| | | | |
|---|---|---|---|
| 3,146,320 | 8/1964 | Wang et al. ................... | 35/35 R X |
| 3,360,873 | 1/1968 | Tillotson et al. ................... | 35/9 A |
| 3,660,912 | 5/1972 | Laplume ............................. | 35/9 A |

Primary Examiner—William H. Grieb
Attorney, Agent, or Firm—Richards, Harris and Medlock

[57] ABSTRACT

A system for teaching spelling, arithmetic or other drill subject is disclosed which utilizes a magnetic tape to store signals containing both oral questions and digital data representative of the correct answer to the question. A teacher's encoding unit provides means for recording the question on the magnetic tape, and means for encoding and recording on the tape the correct alphabetical or numerical answer to the question. A student's unit includes a playback system for reproducing the signals from the tape and presenting the question to the student. The student then sets the alphabetical or numerical answer into an encoder and a comparator compares the answer encoded by the student with the coded answer stored on the tape.

Each of the units features an encoder having twelve character select switches each having 27 positions. A dual indicator system permits the entire alphabet plus the entire numerical system, or a total of 52 characters to be included in the answers.

3 Claims, 15 Drawing Figures

INVENTOR:
JACK S. KILBY

INVENTOR:

JACK S. KILBY

INVENTOR:
JACK S. KILBY

INVENTOR:
JACK S. KILBY

TEACHING SYSTEM

This is a continuation of application Ser. No. 154,493, filed June 18, 1971, now abandoned.

This invention relates generally to systems for teaching, and more particularly relates to a system for teaching subjects requiring repetitive drill such as spelling, and basic math.

Modern methods of teaching have been developed recently which make elementary school subjects interesting and attractive to children. There is, however, still a need for drill or repetitive exercises to teach certain subjects, such as spelling and arithmetic, by rote. Proposals have been made for the use of computer systems in elementary education and a number of computer programs have been developed for this purpose. Tests which have been made in a number of schools have established the benefits of teaching using these computer methods. Very sophisticated computer programs have been developed which permit branching, or alternate questions, depending upon the degree of mastery of the previous work.

Computerized teaching has not been widely used in school systems due to the cost involved. Although time sharing computers tend to reduce the cost, the minimum cost of an installation with sixteen terminals is currently on the order of $300,000.00, or nearly $20,000.00 per terminal. Although additional terminals lower the cost per terminal, it is unlikely that the cost will go below $2,000.00 per terminal using presently available equipment.

Some very simple forms of individual teaching machines have also been proposed. Basically, these machines consist of a means which exposes one question at a time and a set of keys which permit the student to select the correct answer from a short multiple choice list. Means are provided to compare the answer printed on the sheet to the student's selection from the multiple choices. Although these machines are relatively inexpensive, little is contributed to the teaching function. The machines do permit instant grading or the indication of correct answers quickly, which is a desirable feature. However, the desirable features are not sufficient to overcome the disadvantages of limiting the answer to multiple choice form.

The present invention is concerned with a teaching system which is particularly suited for teaching spelling, arithmetic, or any other subject which requires repetitive drill. The answer may be any word or phrase limited only by the number of character encoding switches utilized. The unit is relatively inexpensive, about $200.00 or less, so that it may be used both in the classrooms and in the home. Standard cassette tapes may be repeatedly used to present different course material by local teachers, or may be prepared on a mass produced centralized basis. The teaching system permits each student to proceed at a pace suited to his individual ability. An immediate response is provided to each student following his selection of an answer.

In a preferred embodiment of the present invention, the teaching system comprises magnetic record means, a teacher's unit having means for sequentially recording a question and a set of data pulses representative of the correct answer to the question on the record means, a student's unit having means for reproducing the question from the magnetic record means, means under the control of a student for encoding an answer, and means for comparing the answer represented by the set of data pulses with the answer encoded by the student.

For other teaching applications, a video output may be desirable. In this case, EVR or magnetic video recording and playback units may be substituted directly for the audio magnetic recorders of the preferred embodiment. In either case, oral questions and the data pulses may be recorded on the audio channel of the video recorder.

In more specific aspects, the encoding means comprises a plurality of encoding switches each having a plurality of positions. In a preferred form, each encoding switch has at least twenty-six positions and includes means for visually associating each of the positions with a character of the alphabet. Each encoding switch may also include means for associating the position of the switch with a second set of characters, such as numerals and symbols.

The novel features believed characteristic of this invention are set forth in the appended claims. The invention itself, however, as well as other objects and advantages thereof, may best be understood by reference to the following detailed description of an illustrative embodiment, when read in conjunction with the accompanying drawings, wherein:

Figure 1:
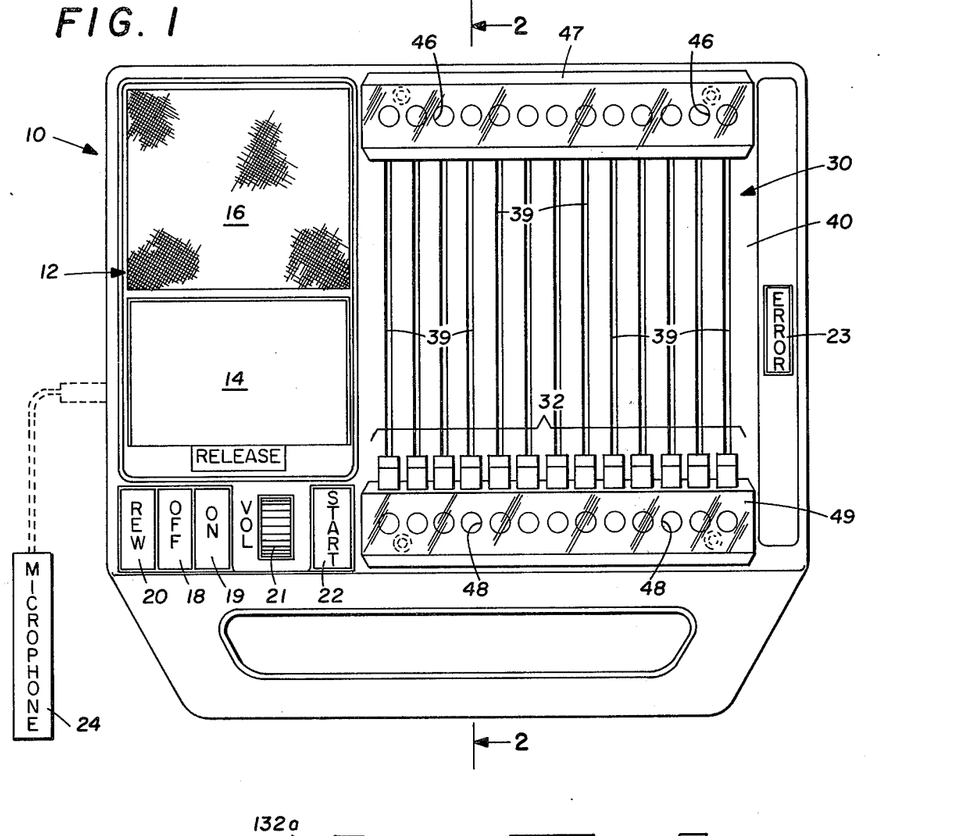
FIG. 1 is a plan view of a teacher's or student's unit of the teaching system of the present invention.

Referring now to the drawings, and in particular to FIG. 1, a teacher's or student's unit of the teaching system in accordance with the present invention is indicated generally by the reference numeral 10. The unit 10 comprises a conventional cassette magnetic tape recording and/or reproducing unit 12. The unit 12 need have only a reproducing capability for a student's unit and only a record capability for a teacher's unit. Or the unit 12 may have both record and reproducing capability where the unit 10 is to serve both the teacher and the student. The tape unit 12 has a cassette receiving chamber indicated at 14 and a speaker indicated at 16. The tape unit 12 has conventional control buttons 18, 19 and 20 for "OFF", "ON" and "REWIND", respectively, and a volume control knob 21. The tape unit may be a standard commercially available cassette unit. An additional control button 22 designated "START" is provided for purposes which will hereafter be described. A microphone 24, indicated in dotted outline, is used only in connection with the teacher's unit as will hereafter be described. An error light 23 is used only on the student's unit.

Figure 2:
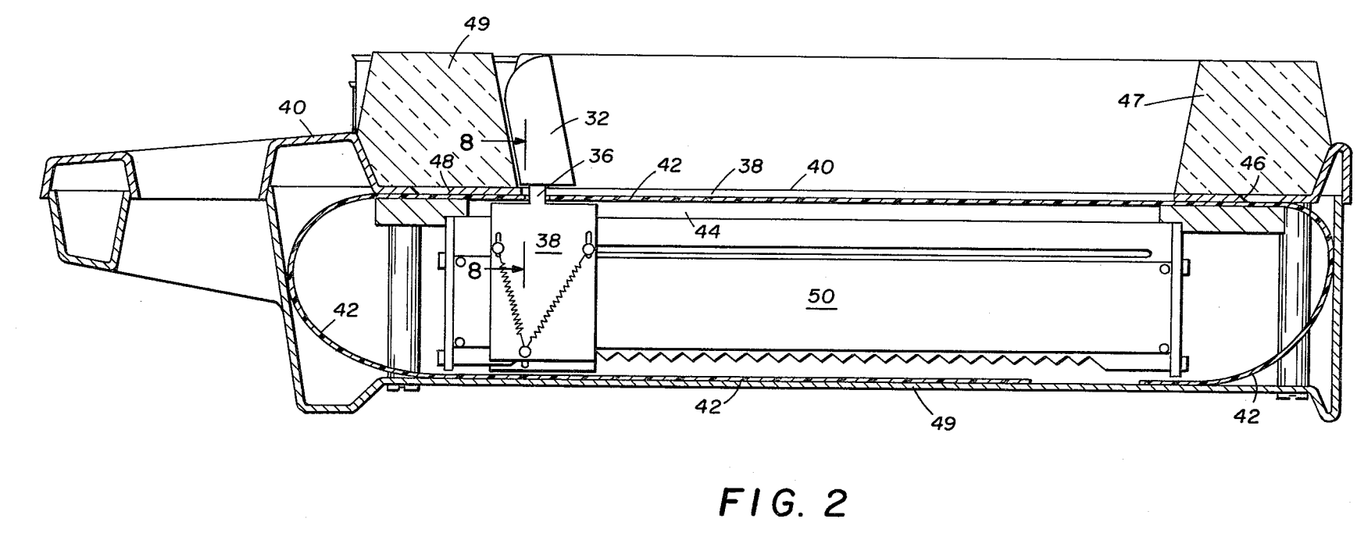
FIG. 2 is a sectional view taken substantially on lines 2—2 of FIG. 1.
Figure 3:
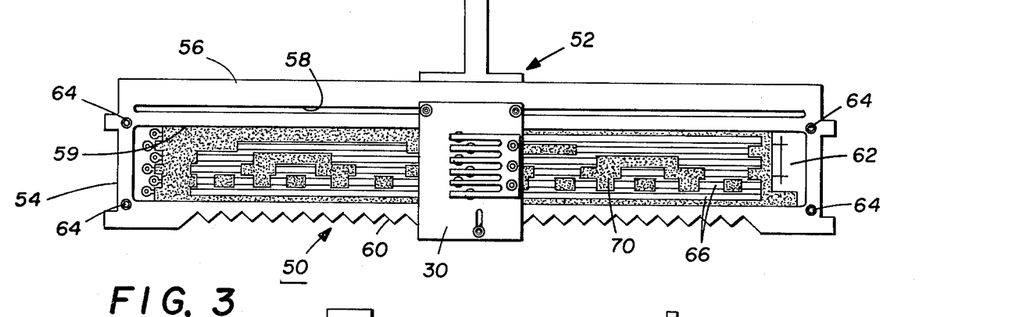
FIG. 3 is a side view of one encoding switch of the unit illustrated in FIG. 1.
Figure 4:
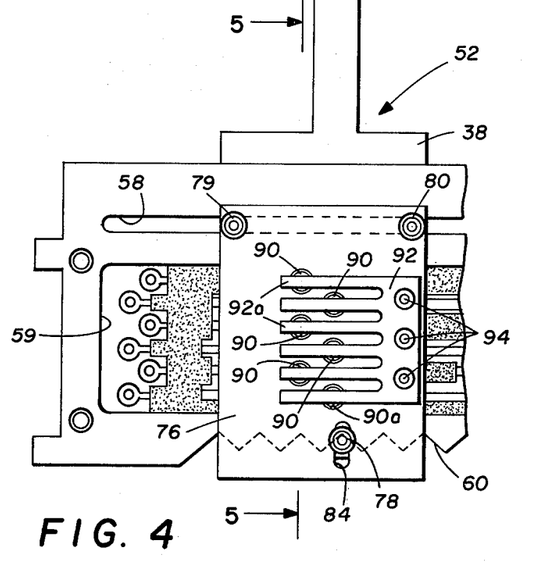
FIG. 4 is an enlarged view of the slide mechanism of the encoding switch of FIG. 3.
Figure 5:
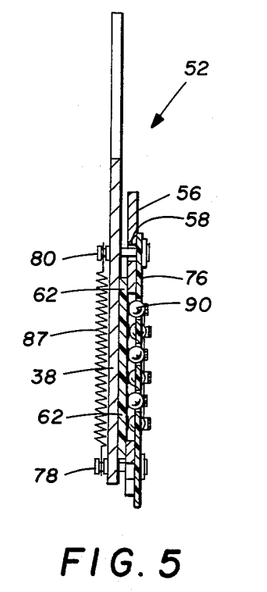
FIG. 5 is a sectional view taken substantially on lines 5—5 of FIG. 4.
Figure 6:
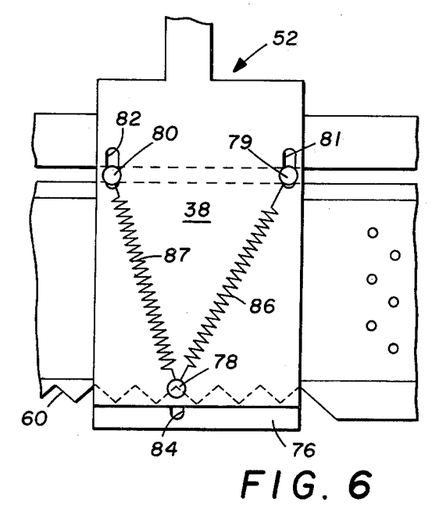
FIG. 6 is a view of the side of the slide mechanism opposite that shown in FIG. 4.
Figure 7:
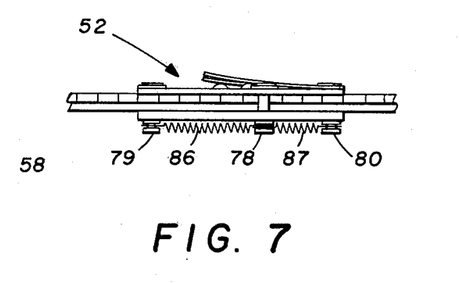
FIG. 7 is a bottom view of the slide mechanism shown in FIG. 4.

The unit 10 includes an answer encoder indicated generally by the reference 30. The encoder has twelve encoding switches 50, each having manually operable tabs indicated collectively by the reference numeral 32. The tabs 32 are mounted on extensions 36 of plates 38 of the slides of the encoding switches which will hereafter be described in detail. The extensions 36 slide in slots 39 in the top half 40 of the case for the unit 10. Each of the extensions 36 passes through a hole in an indicator strip 42. The indicator strips 42 are slidably disposed in grooves formed in the top surface of a retainer plate 44 disposed immediately below the upper half 40 of the case. The strips 42 pass beneath a first set of openings 46 at the top of the unit as viewed in FIG. 1, and beneath a second set of openings 48 at the bottom. Each end of the strips 42 then is bent back by the side walls of the lower half 49 of the case and slides along the upper face of the lower half 50, as can be seen in FIG. 2. Magnifying prisms 47 and 49 are disposed over the openings 46 and 48 to facilitate viewing the small characters.

All 26 characters of the alphabet are imprinted on each of the strips 42 on the half which is displayed through the openings 46. All numeric characters are imprinted on the portion of the strips 42 which are seen through the openings 48. The strips 42 may conveniently comprise strips of conventional film upon which the alpha-numeric characters have been photographically printed. Each strip also preferably displays a blank space through the openings 46 and 48 when the tabs are in the positions illustrated. Thus, any twelve character word or phrase can be composed in the line of openings 46 by moving the tabs 32. These words may be presented in the conventional manner from left to right. On the other hand, any set of numerical numbers may be composed in the openings 48 by moving the tabs 32 to the same positions. The numeric presentation may be from right to left in the conventional manner. However, each position of each tab 32 indicates both an alphabetic character and a numeric character.

Figure 9:
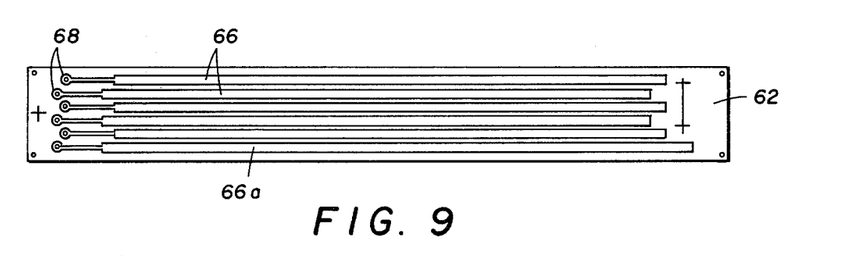
FIG. 9 is a side view of the printed circuit board of the encoding switch of FIG. 3.
Figure 10:
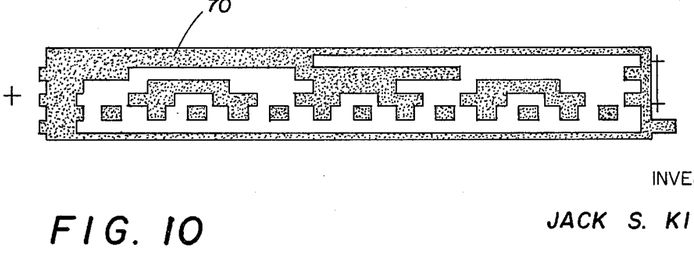
FIG. 10 is a side view of the insulation pattern placed on the printed circuit of FIG. 9 to provide the binary coded answer.

Each of the tabs 32 is associated with an encoding switch indicated generally by the reference numeral 50 in FIGS. 2-7. As can best be seen in FIG. 3, each of the encoding switches 50 comprises a slide unit, indicated generally by the reference numeral 52, and a frame unit indicated generally by the reference numeral 54. The frame unit 54 comprises a stamped sheet of metal 56 having a slot 58 extending along the top edge, saw tooth detents 60 extending along the bottom edge, and a window 59. A printed circuit board 62 is mounted in the window 59 by rivets 64. The metallic conductive pattern illustrated in FIG. 9 is formed on the circuit board 62 and comprises six metal strips 66 which extend parallel for substantially the length of the board 62. Each of the strips 66 terminates at a solder connection aperture 68. An electrically insulating paint in the pattern shown in FIG. 10 is applied to the surface of the metallic strips 66 and the printed circuit board 62. The paint is indicated by the striped areas and is designated by the reference numeral 70. It will be noted that the lowermost metallic strip 66a is left exposed over its entire length. The remaining five metallic strips 66 are coated in such a manner as to provide a unique combination of exposed and insulated conductors for each of twenty-seven positions of the slide mechanism defined by the saw toothed detents 60.

The slide mechanism 52 is comprised of a detent plate portion 38 (previously described) disposed adjacent the frame 56 and an insulated contact support plate 76 disposed adjacent the printed circuit board 62. The plates 38 and 76 are interconnected at pins 78, 79 and 80. The upper pins 79 and 80 are fixed in the contact support plate 76 and extend through the horizontal slot 58 in the frame and through vertical slots 81 and 82, respectively, in the detent plate 38. The pin 78, on the other hand, is fixed in the detent plate 38 and extends through a vertical slot 84 in the contact support plate 76. Each of the pins 78, 79 and 80 have enlarged heads adjacent the slots 84, 81 and 82, respectively, to prevent separation of plates 38 and 76. The lower pin 78 is biased upwardly into the saw tooth detents 60 at the bottom edge of the frame 54 by springs 86 and 87 which interconnect pin 78 and pins 79 and 80, respectively. Thus, when the tabs 32 are pressed downwardly, the detent plate 38 is moved downwardly to the limits of the slots 81, 82 and 84 so that the detent pin 78 will clear the saw tooth detents 60. The slide may then be moved to the desired position representative of an alphabetic or numeric character.

The contacts support plate 76 is provided with six openings, one being super-imposed over each of the conductive strips 66 of the printed circuit 62. Six metallic balls 90 are retained within these openings by a metal contact plate 92 which is connected to the support plate 76 by rivets 94. The contact plate 92 has a spring-like finger 92a disposed adjacent each ball. Each finger 92a retains the respective ball 90 in the hole in the support plate 76 and also urges the ball against the respective metallic strip 66. As previously mentioned, the lower strip 66a is exposed over its entire length and provides a means for continuously energizing the contact plate 92 and hence all of the balls 90. Each of the other five balls 90 then forms a switch which is closed when in contact with a metallic strip 66 and which is open when in contact with the insulating paint over the respective strip.

Figure 11:
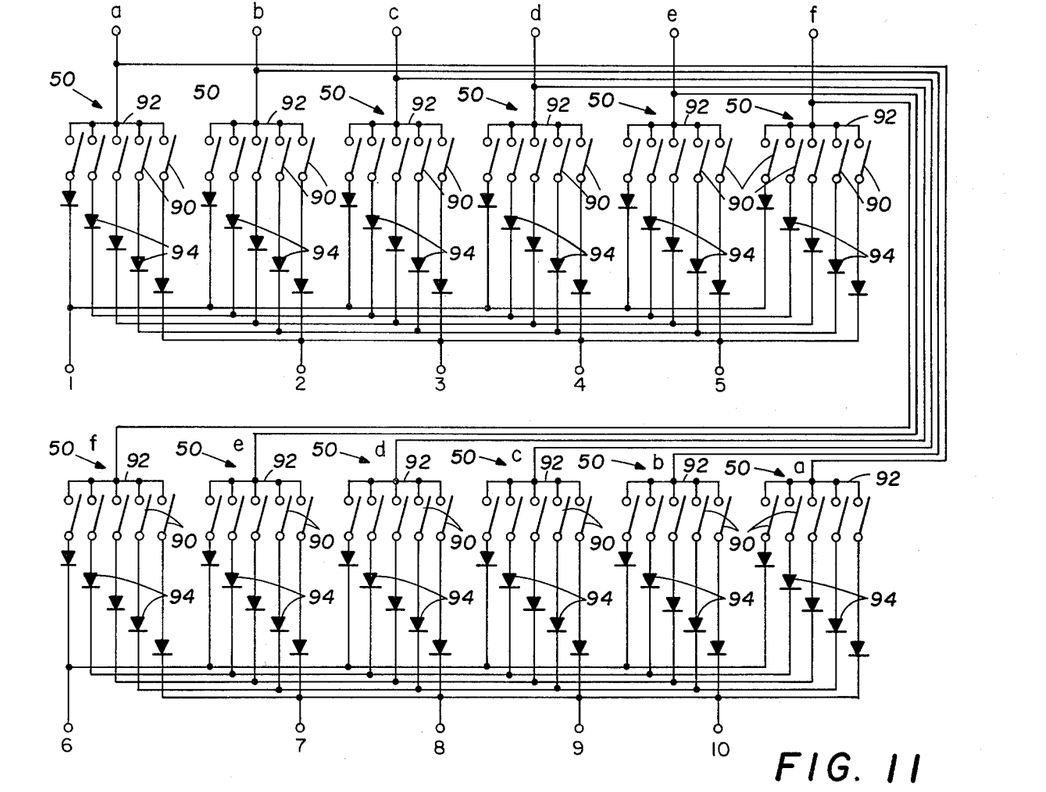
FIG. 11 is a schematic circuit diagram illustrating how the encoding switches of the unit of FIG. 1 are electrically connected in the system.

These switches 90 are shown schematically in FIG. 11. The strip 66a and the ball 90a complete the circuit to the plate 92, which is represented by the common buses designated by the reference character 92 in FIG. 11. The plates 92 of the twelve encoder switches 50 are addressed two-at-a-time by connecting a positive enabling voltage to terminals a–f. Each of the individual switches 90 of each encoder 50 is addressed through a diode 94 by only one of the address lines 1–10 which are sequentially connectable to ground as will hereafter be described.

Figure 12:
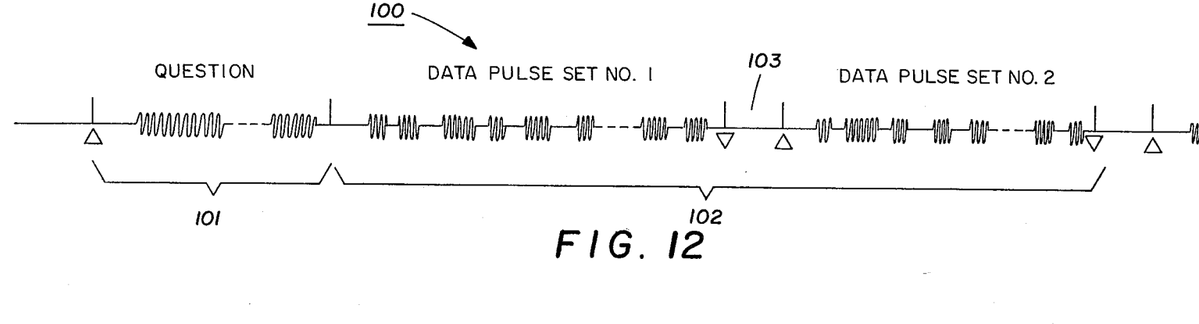
FIG. 12 is a schematic representation of a magnetic record in accordance with the present invention.

Referring now to FIG. 12, a magnetic record means in accordance with the present invention is indicated generally by the reference number 100. In a preferred form, the record means 100 is a standard commercial magnetic tape in a standard cassette. Signals are magnetically stored on the record 100. The signals represent a plurality of question and answer sets such as represented in FIG. 12. Each question and answer set includes a question section 101 followed by an answer section 102. The question section preferably comprises audio signals for presenting the question audibly to the student, but may be television signals having merely video or both video and audio. The answer section comprises a series of digital pulses. In the specific embodiment of this invention, the answer section comprises three subsections. The first subsection is designated Data Pulse Set No. 1 and comprises 60 pulses of binary modulated pulse width which is used to stop tape travel as hereafter described. The second subsection designated by the reference numeral 103 is a space which permits the tape to come up to operating speed. The third subsection designated Data Pulse Set No. 2 comprises 60 pulses each having a binary modulated pulse width which contains the correct answer to the question of the set. Each of the data pulses has a duration of approximately 5 milliseconds, or in the alternative, a duration of approximately 15 milliseconds. The length of the pulses represent the binary information carried by each pulse. Each of the pulses when reproduced is a sine wave of a predetermined frequency, for example, 5000Hz.

Figure 13:
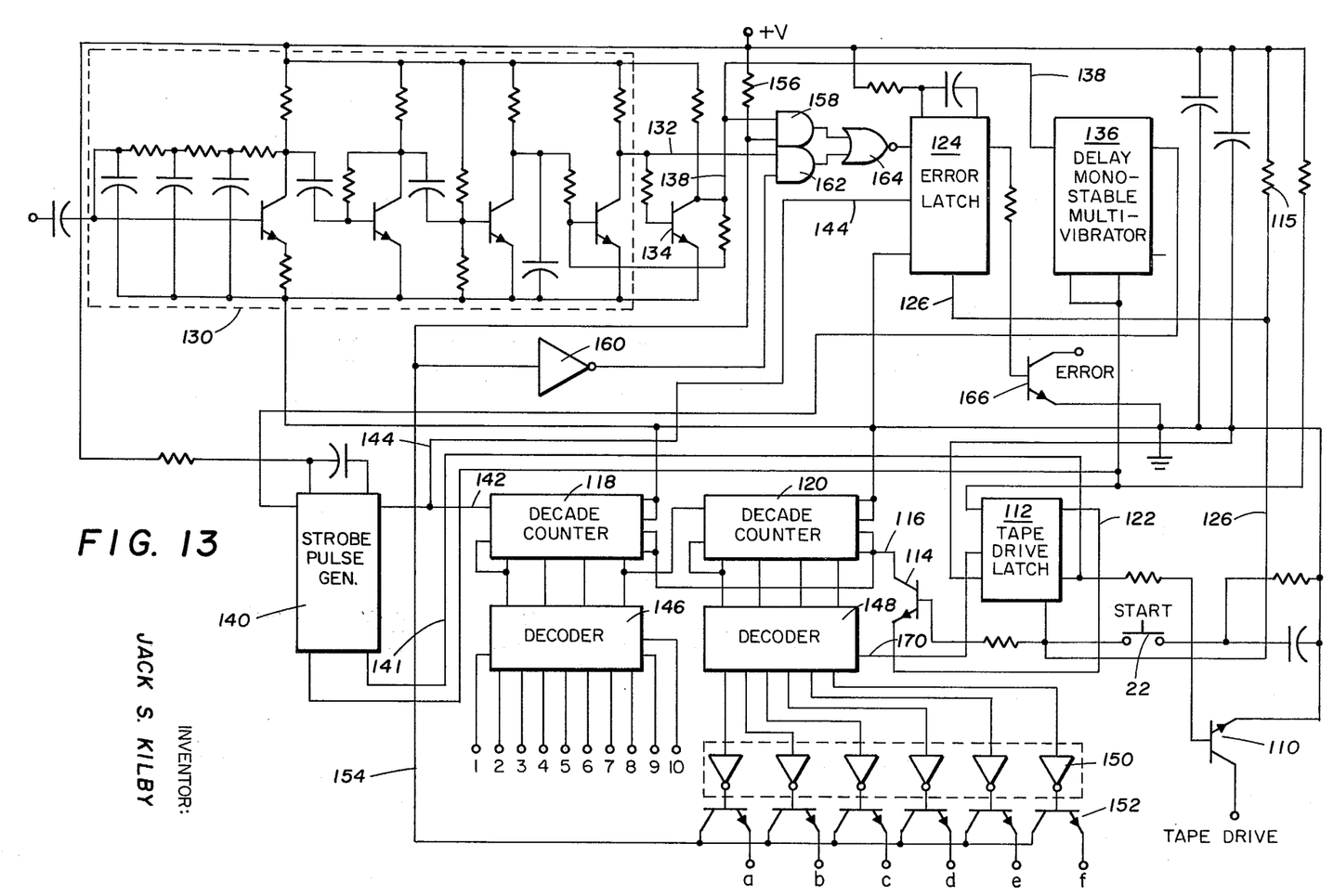
FIG. 13 is a schematic diagram of the logic circuit for a student's unit.

The logic circuitry of FIG. 13 is used in the student's unit which functions as follows. When the student presses the "START" button 22, the tape begins to move and the question contained by the audio portion 100 is presented to the student. The tape continues to move until the Data Pulse set No. 1 is played out to cause the tape to stop. The student then encodes his answer by manipulating the tabs 32 and referring to the characters displayed through openings 46 or 48. When the student again presses the "START" button 22, the second set of data pulses 104 are reproduced and the answer contained by Data Pulse Set No. 2 compared to the answer set into the encoding switches 50 by the student. When the comparison is complete, the tape again stops. If the student's answer is incorrect, the error indicator 23 is illuminated. The procedure is then repeated for the next question.

Referring now to FIG. 12, transistor 110 activates the tape drive motor of the tape unit 12 when turned on. Transistor 110 is controlled by the complement output of a tape drive latch 112. The tape drive latch 112 is reset to a logic "0" state by depressing the "START" switch 22 to connect the reset terminal 114 to ground.

When the "START" switch 22 is closed, the base of transistor 114 is grounded and the transistor is turned off, causing reset line 116 to go to a positive level, thereby resetting decade counters 118 and 120 to the count of zero. After the tape drive latch 112 has been reset to the logic "0" state, the true output 122 is at a logic 0 level and permits transistor 114 to turn on, thus removing the high reset signal from the decade counters 118 and 120. Closing the "START" switch 22 also resets an error latch 124 by way of line 126.

Figures 8, 14:
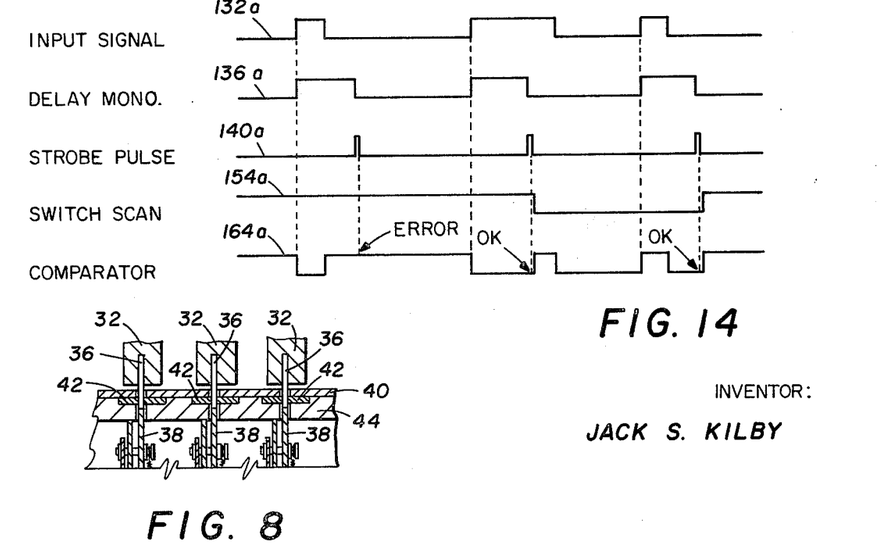
FIG. 8 is a sectional view taken substantially on lines 8—8 of FIG. 2.
FIG. 14 is a timing diagram which illustrates the operation of the circuit of FIG. 13.

When the tape is running, audio signals are produced in the conventional manner through the speaker 16 so that a student may hear the question carried by signals 101 on the tape 100. A circuit 130, bounded by dotted outline, filters, amplifies, and integrates the 5KH sine wave of the data pulses to produce a DC logic level on line 132 which is the "true" data input, and is represented by line 132a in FIG. 14. As previously mentioned, the data pulses have a width of either approximately 5 milliseconds or approximately 15 milliseconds. The output of inverter stage 134 provides the complement of the input and triggers a delay monostable multivibrator 136 by way of line 138. The output pulses from the multivibrator 136 are indicated by wave form 136a in FIG. 14, and are approximately 10 milliseconds in duration.

The output from the delay monostable multivibrator 136 is applied to a strobe pulse generator 140. The strobe pulse generator is also a monostable multivibrator, but produces a short strobe pulse as represented by the wave form 140a in FIG. 14 each time the output pulse from the multivibrator 136 goes from the logic "1" to the logic "0" level. The strobe pulses clock the decade counter 118 and the error latch 124 by way of lines 142 and 144. The tenth count of decade counter 118 clocks the second stage counter 120.

The outputs from the first decade counter 118 are fed to decoder 146. All of the outputs of the decoder 146 are normally at a logic "1" level, except one which is at a logic "0" level and represents the count of the counter 118. The outputs from the second counter 120 are applied to a second decoder 148. The decoder 148 has seven outputs which are also all at a logic 1 level except one which is representative of the count. The outputs are applied through a set of inverters 150 to the bases of a set of switching transistors 152, so that only one of the transistors at any time is turned on. The collectors of the transistors 152 are connected by a status line 154 and resistor 156 to the positive voltage supply. The emitters of the transistors 152 are connected to terminals a-f of the switch encoder circuitry illustrated in FIG. 11. The outputs 1–10 of the decoder 146 are connected to the terminals 1–10 in FIG. 11.

The status line 154 is connected to one input of an AND gate 158 and through an inverter 160 to an input of another AND gate 162. The "true" input line 132 is applied as the other input to the AND gate 162, and the complement input line 138 is applied as the other AND gate 158. The outputs from gates 158 and 162 are applied to a NOR gate 164. The gates 158, 162 and 164 form a logic comparator which produces a logic 1 level whenever the levels on lines 132 and 154 are different and a logic 0 when the levels are the same. The output from gate 164 of the comparator is applied to the input of error latch 124. The logic level on line 154 is indicated by wave form 154a in FIG. 14 and the output from gate 164 of the comparator is represented by waveform 164a. The error latch 124 is switched to a logic 1 state to turn on a transistor 166 and light the error light 23 only in response to a strobe pulse on line 144.

When the decoder 148 reaches the count of seven, line 170 goes to a logic 0 level to clock the tape drive latch to a logic 1 level. This turns transistor 110 off and stops the tape.

Figure 15:
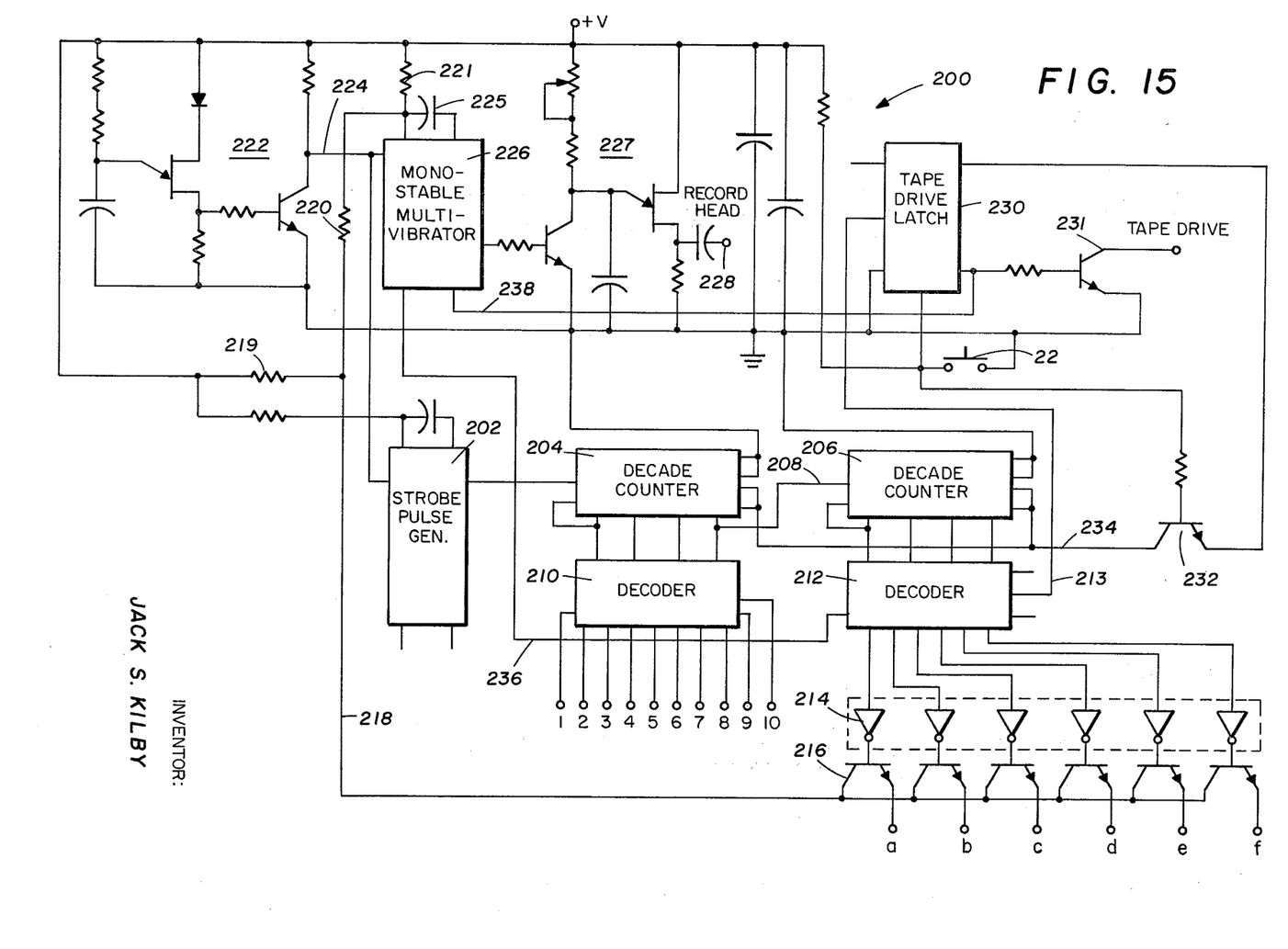
FIG. 15 is a schematic diagram of the logic circuit for a teacher's unit.

The logic circuit of FIG. 15 is used in the teacher's unit. As mentioned, the teacher's unit includes a microphone 24 and circuit means for recording and replaying the questions onto the tape. In its simplified form, the teacher's unit requires only the circuit of FIG. 15. If the teacher's unit is to also serve as a student's unit, the function of the circuits of FIGS. 13 and 15 may be combined in the same unit. Briefly, the teacher first sets in the correct answer by using tabs 32, then depresses the "START" switch 22 while dictating the question. Upon release of the "START" switch 22, the 60 pulses representative of the correct answer are recorded on the tape as Data Pulse Set No. 1. The tape then automatically stops. The "START" button is again pressed and Data Pulse Set No. 2 is recorded to provide the correct answer at the proper position on the tape.

Referring now to FIG. 15, a strobe pulse generator 202 produces a pulse which drives a first decade counter 204. The decade counter 204 clocks a second decade counter 206 on the tenth count by way of line 208. A decoder 210 produces a logic 0 level on one of lines 1–10 corresponding to the count of the decade counter 204. A decoder 212 sequentially produces a logic 0 level on the second through the seventh counts of counter 206. The outputs resulting from the first and eight counts are used for other purposes which will presently be described. The logic 0 levels are inverted by a bank of six inverters 214 and applied to the bases of transistors 216. The collectors of the transistors 216 are connected to a status line 218 which is connected to and forms a part of a pulse width modulating network including resistors 219, 220 and 221 and capacitor 225.

A first oscillator circuit 222 produces a series of pulses at the rate correponding to the rate of the 60 pulses of the Data Pulse Sets Nos. 1 and 2. The output 224 of the oscillator 222 is connected to the input of a monostable multi-vibrator 226 and to the input of the strobe pulse generator 228. The complement output from the multivibrator 226 is applied to the input of a tone generator 227 which produces a 5KHz signal. This tone signal is applied to the record head of the tape unit 12 by way of terminal 238. It will be recalled that the filter circuit 180 in FIG. 13 is tuned to pass 5KHz.

The duration of the pulse from the monostable multivibrator 226 is determined by the condition of the particular switch 90 that is addressed by decoders 210 and 212. If the switch address is closed, current passes through status line 218, the enabled transistor 216 to one of lines a–f, the addressed switch 90, and to the line 1–10 of decoder 210 that is at a logic 0 level which is ground. This current delays the time required to charge capacitor 225, thus increasing the width of the pulse from monostable multivibrator 226 to about 15 milliseconds. If the address switch is open, the capacitor 225 charges more rapidly and the output pulse of the monostable multivibrator 226 is about 5 milliseconds.

The tape drive is controlled by the tape latch 230. The tape drive latch 230 is reset when the "START" switch 22 is closed by the teacher. The teacher then dictates the question while the switch 22 is closed. The closing of the switch 22 also turns transistor 232 off, thus holding the decade counters 204 and 206 in the reset mode by way of line 234. When decade counter 206 is reset to the count of one, line 236 is at a logic 0 level which disables the multivibrator 226. The monostable multivibrator 226 is also disabled more rapidly by line 238 from the complement output of the tape drive latch when the tape drive is turned off.

Thus, after a question has been dictated, the switch 22 is released and opens so that transistor 232 will conduct and permit the decade counters 204 and 206 to increment in response to pulses from generator 202 which are always produced. After the decade counter 204 has proceeded through ten counts, counter 206 is incremented to the count of two and line 236 goes to a logic 1 level, thus enabling the monostable multivibrator 226. The delay in enabling the multivibrator 226 provides time for the tape drive to come up to speed after a student has set in his answer as will presently be described.

OPERATION

An important advantage of the teaching system of the present invention is that the teaching material can be easily prepared on a local basis by a teacher in direct contact with the student. The teaching material may involve any type of question having an answer which may be expressed using either alphabetical or numerical characters. Alternatively, the magnetic tapes may be prepared at a central processing point and distributed to the classroom.

Assume that the teacher is to prepare a cassette tape using a teacher's unit having the circuitry of FIG. 15 and recording capability. The teacher depresses the "START" button 22 and holds it depressed while dictating the question into the microphone 24. When the "START" button 22 is closed, the tape drive latch is reset to a logic 0 level so that transistor 231 is turned on and the tape drive activated. Since the true output of the tape drive latch 230 goes to a logic 0, transistor 232 would be turned on except for the fact that the switch 22 grounds the base so long as it is held closed. This permits line 234 to go positive which holds counters 204 and 206 in the reset condition so long as the "START" button 22 is depressed. When the tape drive latch goes positive, line 238 enables the monostable multivibrator 226, but this is overridden by the fact that line 236 from the decoder 212 is at a logic "0" level as a result of the reset of the decade counter 206. Thus, even though the oscillator 222 continues to produce pulses, the monostable multivibrator 226 is disabled and the oscillator 227 remains inactive so that no pulse tones are recorded on the tape. Although the strobe pulse generator 202 continues to produce strobe pulses, the decade counter 204 continues to remain in the reset condition because of line 234 remaining at a high level.

During the time the question is being dictated, the tabs 32 may be in any position. However, it is preferred that the tabs be preset to the correct answer to prevent the error light 23 from being illuminated falsely. When the question has been recorded on the tape, the "START" switch 22 is released and it opens. The base of transistor 232 is then connected to the positive voltage supply and is turned on so that line 234 may go to a low level. Decade counter 204 then begins to count from 1 to 10. However, no pulses are recorded on the tape during the first ten counts of the decade counter 204 because monostable multivibrator 226 remains disabled by the output 236 from the decoder 212.

When decade counter 206 is incremented by the tenth count of the decade counter 204, line 236 goes high, thus enabling the monostable multivibrator 226. Each successive pulse from the oscillator 222 then triggers a strobe pulse from the monostable multivibrator 226. Each time the complement output of the monostable multivibrator 226 goes to a logic 0, the tone generator 227 is activated and a tone pulse is recorded. The duration of the tone pulse produced by the monostable multivibrator 226 is determined by the condition of the particular switch 90 that is addressed by output line 1 from decoder 210 and output line A. However, the length of the pulse is immaterial because Data Pulse Set No. 1 in FIG. 14 does not carry the answer to the question, but instead is used as a means of stopping the tape drive as will hereafter be described. The monostable multivibrator proceeds to record 60 tone pulses on the tape in response to 60 pulses from oscillator 222.

At the end of 60 pulses from the oscillator 222, and hence from the strobe pulse generator 202, the decade counter 204 has been cycled six times and the decade counter 206 reaches the count of seven. At this point, output 213 sets the tape drive latch to a logic 1 state, thus turning transistor 231 off and deactivating the tape drive. At the same time, the complement output from the tape drive latch 230 goes to a logic 0 and thus disables monostable multivibrator 226 by way of line 238. The logic 1 level at the true output of the tape drive latch 230 also stops conduction of transistor 232, thus resetting the decade counters 204 and 206. When decade counter 206 is set to the first count, the decoder 212 produces a logic 0 on line 236 to also disable the monostable multivibrator 226. This procedure results in the recording of the question section 101 and Data Pulse Set No. 1 on the tape 100 of FIG. 12.

The teacher then manipulates the tabs 32 to set the correct answer to the question in either the windows 46, in the case the answers are to use alphabetic characters, or in the openings 48 for numerical questions, if this has not already been accomplished before dictating the question. After the correct answer has been set into the encoders, the "START" button 22 is momentarily closed to repeat the cycle just described. As soon as the "START" button is closed, the tape drive is initiated and line 238 goes to a logic 1 level to partially enable the monostable multivibrator 226. When the switch 222 again opens, transistor 232 is turned on so that line 234 goes to a low voltage level to reset the decade counters 204 and 206. However, the monostable multivibrator 226 again remains disabled by line 236 as decade counter 204 increments through the first ten counts as a result of the pulses produced by an oscillator 222 and strobe pulse generator 202.

After the decade counter 204 has incremented the decade counter 206 to the count of two, monostable multivibrator 226 is enabled by line 236 going to the logic 1 level. On the next pulse from oscillator 222, both the monostable multivibrator 226 and the strobe pulse generator 202 are activated at the same time. Immediately upon activation, the monostable multivibrator 226 activates the oscillator 227 to record the tone on the tape. If the switch 90 addressed by output one of the decoder 210 and output a of the decoder 212 is open, the oscillator 227 is turned off after approximately 5 milliseconds. If, however, the addressed switch 90 is closed, the multivibrator 226 turns oscillator 227 off at the end of about 15 milliseconds. The pulse width is therefore representative of the binary states of the pulse.

The output pulse from strobe pulse generator 202 endures for approximately 20 milliseconds so that the decade counter 204 is clocked after the termination of the longest possible tone pulse is recorded on the tape. When the decade counter 204 is incremented, output line two of the decoder 210 goes to a logic 0 level and all other lines are at a logic 1 level. The switch 90 that is addressed by output line 2 from decoder 210 and output line a from decoder 212 then controls the length of the next pulse recorded on the tape. This procedure is repeated to sequentially scan all 60 of the switches 90 associated with the twelve encoding switches 50. After the sixtieth tone pulse of Data Pulse Set No. 2 has been recorded on the tape, output 213 of decoder 212 clocks the tape drive latch 230 to the logic 1 state, thus turning off transistor 231 and deactivating the tape drive. At the same time, the monostable multivibrator 226 is disabled by line 238 and the counters 204 and 206 are reset when transistor 232 is turned off and line 234 goes high. The second set of data pulses thus contain the correct answer to the question.

After the cassette tape is prepared by recording successive questions and answer sets, the cassette is merely inserted in the cassette chamber 14 of the student's machine 10, the unit turned on, the volume adjusted, and the "START" button depressed. When the "START" button 22 is depressed, tape drive latch 112 (see FIG. 13) is reset to the logic 0 level so that the complement output turns transistor 110 on and thereby activates the tape drive. The audio signal reproduced from the tape then presents the question to the student. The audio signals do not pass through the filter amplifier and integrator circuit 130 to affect the logic control circuit. At the conclusion of the question portion 101, the 60 pulses of the Data Pulse Set No. 1 steps the decade counter 118 and 120 through a complete cycle as a result of the pulses produced by multivibrator 136 and the strobe pulse generator 140. The sixtieth pulse clocks the tape drive latch 112 to the logic 1 state, thus turning transistor 110 off and deactivating the tape drive motor.

The student then manipulates the tabs 32 in a manner to set his answer in the windows 46 or 48, depending upon the nature of the question. The student then again momentarily depresses the "START" button 22. The tape drive latch is immediately reset and the tape drive started. The ten pulse delay introduced to the tape by disabling the multivibrator 226 of the encoding unit during the first ten pulses to the counter 204 enables the tape to accelerate to operating speed before data pulses are reproduced. When the "START" button 22 is depressed, the counters 118 and 120 were reset to the count of one so that only output line 1 of the decoder 146 is at a logic 0 level and so that only the transistor connected to terminal a is turned on by a positive voltage applied to its base, while the remaining transistors are disabled. The logic level on line 154 is immediately indicative of the state of the switch 90 addressed by lines a–l.

When the first pulse from the data pulse set 104 is received, the time output line 132 goes to a logic 1 and the complement output lines 138 goes to a logic 0. The logic 1 and the logic 0 of lines 132 and 138, together with the logic level on line 154 and its complement from inverter 160 are applied to gates 158 and 162. As a result, the output of gate 164 is a logic 1 if the two logic levels are different, and is a logic 0 if the two logic levels are the same. However, the error latch 124 is not set to the logic 1 state even if the output of gate 164 is a logic 1 until it is clocked by a strobe pulse from the generator 140 by way of line 144.

When the complement output 138 goes to a logic 0 level at the start of the data pulse, delay monostable multivibrator 136 goes to the logic 1 state for a period of approximately ten milliseconds. When the output of multivibrator 136 goes negative at the end of the ten millisecond period, strobe pulse generator 140 produces a strobe pulse which simultaneously clocks the error latch 124 and the counter 118. It will be recalled that the data pulse is 5 milliseconds long if the addressed switch 90 was open and is 15 milliseconds long if the addressed switch was closed at the time the correct answer was encoded. On the other hand, line 154 is at a logic 1 level if the corresponding switch 90 is open and is at a logic 0 level if the switch is closed. Thus, if the switch was open at the time the data pulse was recorded and the student has the encoding switches properly set so that the same encoding switch 90 is open, the output from gate 164 10 milliseconds after the start of the data pulse will be a logic 0, and the error latch will remain in the logic 0 state.

The strobe pulse which strobes the error latch 124 also increments the decade counter 118 to the next count. Output 2 of decoder 146 then goes to a logic 0 level so that the state of the switch 90 addressed by output terminals a, 2 then determines the state of line 154. The second data pulse from the set 134 then causes the cycle to repeat. If the output from gate 164 is a logic 1 when strobe pulse occurs, the error latch is set to a logic 1 state, the transistor 166 is turned on, and the error light 23 is illuminated.

When the counter 120 reaches the count of 7, indicating that 60 data pulses have been reproduced, the decoder 148 clocks the tape drive latch 112 by way of line 170 to deactivate the tape drive motor. When the tape drive latch 112 goes to a logic 1 state, strobe pulse generator 140 is disabled by line 141 going to a logic 0 to prevent further strobing of the error latch 124. Once an error is detected, the error latch 124 remains set to the logic 1 state and the error light 23 remains on until the "START" button 22 is depressed to start the next question and answer cycle.

From the above description of a preferred embodiment of the invention, it will be appreciated by those skilled in the art that a highly novel teaching system has been disclosed. This system provides a means for teaching any subject in which the questions may be presented audibally and answered by a set of alphanumeric characters. Although the answers are limited to twelve characters in the embodiment illustrated, it will be appreciated that longer answers could be provided for merely by increasing the number of encoding switches, and providing the necessary addressing circuitry.

It will also be appreciated that the basic student's units may be mass produced at a relatively low cost. The teacher's unit may be separate from the student's unit, or the teacher's unit and the student's unit may be combined to reduce the cost by using common components. The unit is particularly suited to use commercially standardized magnetic cassette tapes. Within the broader aspects of the invention, a video screen may be provided in addition to the audio signal without changing the basic mode of operation of the system.

Although the teacher and student units are particularly adapted for teaching spelling, arithmetic and similar subjects, the units are also useful for other purposes. For example, the teacher unit may be used to encode inventory data with or without associated verbal comments. The student unit may be used to provide step-by-step instructions to a person assembling or servicing a complex computer or other system. In the latter case, the tape drive may be locked out by an incorrect answer if desired to prevent the user proceeding until a correct answer is encoded.

Although a preferred embodiment of the invention has been described in detail, it is to be understood that various changes, substitutions and alterations may be made therein without departing from the spirit and scope of the invention as defined by the appended claims.

What is claimed is:
1. The teaching system comprising:
   first record means for storing signals including audio signals and data signals,
   second means for recording a question on the record means,
   third means under the control of a teacher for recording a data signal on the record means representative of the correct multiple character alphanumeric answer including
       a predetermined number of reusable alphanumeric character display means each controlled by an independently movable character selector and each being capable of displaying any one of the entire set of selectable characters to the teacher, each being capable of displaying the selected character to the teacher until changed by movement of the respective selector, and
       means for producing an encoded data signal representative of a character represented by the position of the respective selector,
   fourth means for reproducing the signals stored on the record means as electrical signals,
   fifth means for converting the electrical signals to audio signals to pose the question to a student,
   sixth means under the control of a student for composing a multiple character alphanumeric answer including
       a corresponding number of reusable alphanumeric character display means each controlled by an independently movable character selector and each being capable of displaying any one of the entire set of selectable characters to the student until changed by movement of the selector, and
       encoding means for producing a signal representative of the position of each of the selectors, and
   seventh means for comparing the encoded answer and the answer represented by the data signal.
2. The teaching system of claim 1 wherein all of said means are contained in a single portable unit to provide a combined teacher encoding unit and a student teaching unit and the character selectors and display means of the third and sixth means are common.
3. The teaching system of claim 1 wherein the fourth, fifth, sixth and seventh means are contained in a separate unit to provide an independent student's unit.

* * * * *